Nov. 12, 1968  D. M. DAVIS ET AL  3,410,598
CAR CAMPER

Filed Nov. 21, 1966  2 Sheets-Sheet 1

INVENTOR.
DONOVAN M. DAVIS and
RUTH K. DAVIS
BY Woodard, Weikart, Emhardt & Naughton
Attorneys Nov. 12, 1968    D. M. DAVIS ET AL    3,410,598
CAR CAMPER
Filed Nov. 21, 1966    2 Sheets-Sheet 2

INVENTOR.
DONOVAN M. DAVIS and
RUTH K. DAVIS

BY Woodard, Weikart, Emhardt & Naughton
Attorneys

United States Patent Office 3,410,598
Patented Nov. 12, 1968

3,410,598
CAR CAMPER
Donovan M. Davis and Ruth K. Davis, both of 423 N. DeQuincy St., Indianapolis, Ind. 46201
Filed Nov. 21, 1966, Ser. No. 595,798
6 Claims. (Cl. 296—23)

ABSTRACT OF THE DISCLOSURE

A vehicle mounted foldable camper having a floor in two sections, one coupled to the floor of the vehicle trunk, the other pivoted to the first, for storage within the trunk, frame members and a cover suppored by the frame members and the lid of the open trunk when the camper is extended for use.

---

This invention relates to campers and more particularly relates to campers adapted to fold up within a vehicle body when not in use.

Most of the prior art campers adapted for use with vehicles are trailer-like structures which are pulled by the vehicle. With the increasingly more crowded highways, the use of such campers is somewhat unwieldy and dangerous. There has long been a need for a simple, inexpensive camper adapted to fold within a vehicle when the camper is not in use and which is simple to assemble and tear down.

Several prior art campers are adapted to fold within the trunk of a vehicle when not in use. One such camper is provided in U.S. Patent No. 3,115,362, which teaches a camping kit which folds out from the trunk of the car. When in use, it is attached to the rear end of the trunk and is supported on three sets of legs. The disadvantage of the above mentioned prior art device is that the trunk lid must be removed to make room for the structure in transport.

U.S. Patent No. 3,097,013 discloses a structure of the same general type. It is necessary to remove the trunk lid in order to utilize the device, and the device encompasses a rather elaborate folding structure. Still other prior art campers are adapted to fold and mount on top of the trunk lid when not in use.

None of the prior art devices provide a simple, economical camper which folds within the trunk of a vehicle when not in use, and which does not necessitate the removal of the trunk lid or other vehicle alterations in order to use the camper.

Therefore, it is a primary object of the present invention to provide an improved camper adapted to fit within the trunk of a vehicle when not in use.

A further object of the present invention is to provide a camper which folds outwardly from the trunk when in use and wherein the trunk floor provides the support therefor and the trunk lid provides a support means for an enclosing tent.

Still a further object of the present invention is to provide a camper adapted to accommodate several people comfortably which may be carried around with the vehicle at all times, thereby eliminating the inconvenience of loading and unloading or attaching and disassembling a camper.

Related objects and advantages will become apparent as the description proceeds.

One embodiment of the present invention is a camper designed to fold up completely into the trunk of an automobile when not in use and further adapted to accommodate two people. The camper is made up in three sections, front, center and end. The sections are connected together with special hinges to form one assembly. Each section is made of angle iron and plywood or similar material. There are two angle sides to each section connected together crosswise with plywood to form a platform. The platform is reinforced on the underside with metal sections which are, in turn, connected to the side angles.

The front section angles are adapted so that a bolt connects the front section to the floor of the car trunk and holds the unit to the car. This is the only connection to the car. The rear section has a frame means which, in connection with the open trunk lid, forms a frame for a canvas cover that covers the platform and extends forwardly to the car roof and is fastened securely on each side of the car. The platform and canvas cover extend outwardly from the back of the car of a sufficient distance that will allow the proper length to accommodate sleeping people.

The full nature of the invention will be understood from the accompanying drawings and the following description and claims.

Figure 1:
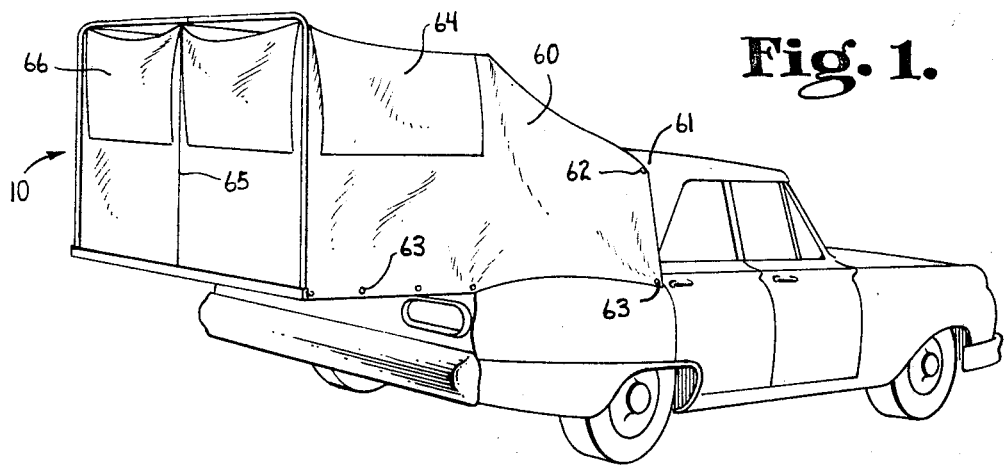
FIG. 1 is a perspective view of one embodiment of the camper fully assembled.

Referring more particularly to the drawings, the camper shown generally at 10 includes a collapsible platform unit shown generally at 11 having three sections, a front section 12, a center section 13 and an end section 14. These sections are connected together with hinges shown generally at 32 and 36 to form one assembly. Each section is made of angle iron and plywood. However, the sections could be made of tubing, channel sections, or any section capable of giving sufficient support. There are two angle sides to each section, connected together crosswise with plywood forming a platform. Each platform is reinforced on the underside with metal sections for additional strength for the plywood. The metal sections 18 are coupled to the side angles.

The front section 12 includes a plywood platform 17A reinforced by side angle members 16A, end plates 18A and center supporting member 19A which is usable alone or in conjunction with cross support members (not shown) which form an X-shaped supporting structure. The end plates are secured to the side angle members by thumb screws or the like. The front end plate of section 12 has an aperture 19 therein which receives a bolt 20. The bolt secures the front section to the floor 21 of the car trunk 22. This is the only coupling means between the platform and the car; thus the installation and removal of the platform within the car trunk is extremely simple.

Similarly, the center section 13 includes a plywood platform 17B reinforced by side angle members 16B, end plates 18B and center supporting member 19B. The rear section 14 also includes a plywood platform 17C reinforced by side angle members 16C, end plates 18C and center supporting member 19C.

The center section has an angle iron member 25 affixed to the underside of side angle members 16B which projects outwardly therefrom. The end section also has an angle iron member 26 affixed to the underside of side angle members 16C and projecting outwardly therefrom. Side angle members 25 and 26 carry a shot bolt locking device 30 thereon. Members 25 and 26 serve to allow only 180° motion to the hinge action.

Figure 2:
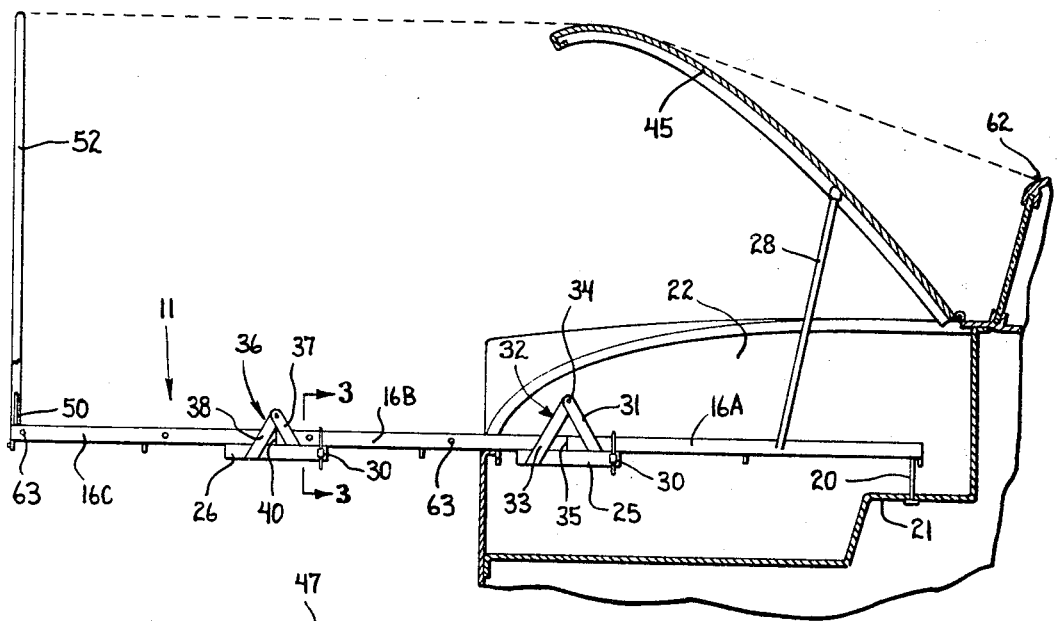
FIG. 2 is a side elevation of the extended platform with a section broken away from the trunk of the car to show the structure therein.
Figure 3:
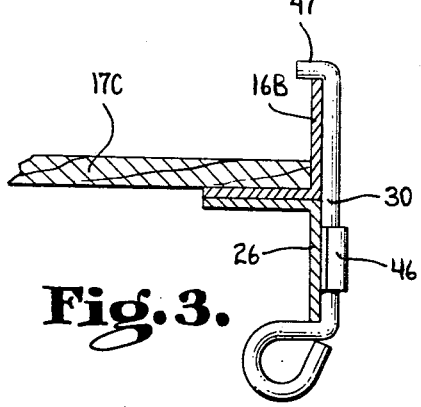
FIG. 3 is a section view of the platform taken through lines 3—3 of FIG. 2 and showing the shot bolt locking construction in detail.
Figure 4:
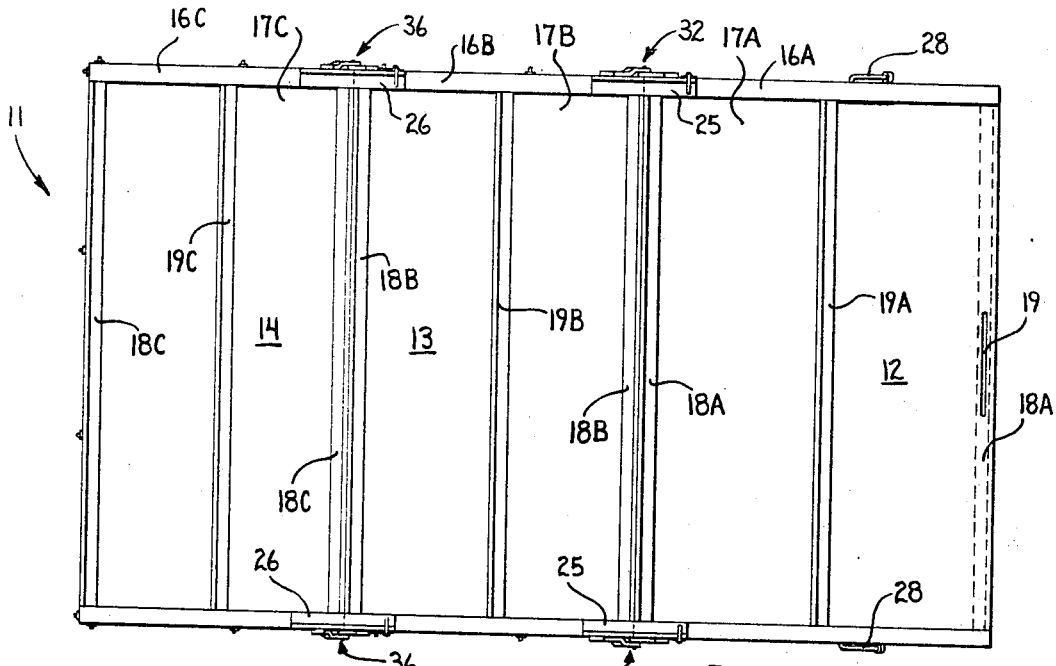
FIG. 4 is a bottom elevation of the extended platform.

To couple the sections together so that they may be folded for storage or opened and locked for use, one half 31 of a pivot hinge shown generally at 32 is affixed toward the rear of side angle members 16A. The second half 33 of hinge 32 is affixed to angle iron member 25. Halves 31 and 33 are pivotally connected at point 34. When the center section has been folded outwardly, as shown in FIG. 2, angle iron member 25 braces the front and center section junction 35. Shot bolt 30 locks the angle iron member 25 to the front section.

Similarly, one half 37 of a pivot hinge shown generally at 36 is affixed toward the rear of side angle members 16B. The second half 38 of the hinge is affixed to the angle iron member 26. Angle iron member 26 braces the center and rear section junction 40. Shot bolt 30B locks the angle iron member 26 to the center section.

Figures 5, 6:
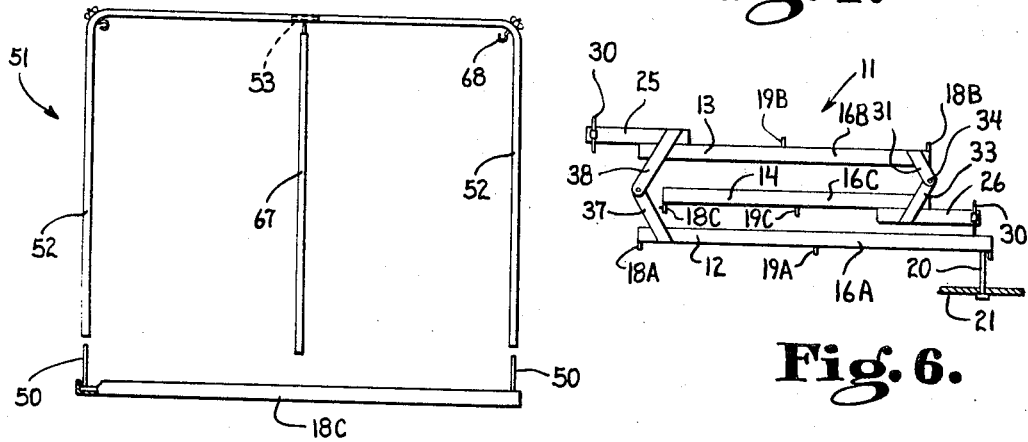
FIG. 5 is a front view of the frame assembly.
FIG. 6 is a side view of the folded platform.

As shown in FIGS. 2 and 6, hinge 32 is larger than hinge 36. That is, sections 31 and 33 of hinge 32 are longer than sections 37 and 38 respectively of hinge 36 to accommodate the folded structure as shown in FIG. 6. Thus, as shown in FIG. 6, to store the camper, the end and center sections are folded over flat onto the front section. A support rod 28 is pivotally mounted on both side angle members 16A. The rod is lifted up to prop open the trunk lid 45 as shown in FIG. 2 when the camper is assembled.

The shot bolts are carried by angle iron members 25 and 26 respectively via a cylindrical bolt receiving member 46 which is affixed to the outer side walls of the angle iron members at their distal ends. Each shot bolt is a substantially P-shaped member with the end 47 of the member turned inwardly in a substantially right-angle bend which hooks over the angle iron 16B or 16A.

The rear end of the side angles 16C each have a vertical rod 50 extending upwardly therefrom which fits into a hollow upstanding leg 52 of a frame shown generally at 51. The legs of the frame extend up each side and matches the height of the open trunk lid 45. The frame also extends across the width of the platform and has a slip joint 53 in the center thereof. The frame and open trunk lid act as a support for a canvas cover 60 which covers the platform and extends forwardly to the car roof 61. The canvas cover is securely fastened down on each side of the car by fastening means 62. The platform and canvas cover extend outwardly from the back of the car for a sufficient distance to accommodate sleeping people.

The sides of the canvas cover fasten to the end and sides of the platform and protrude from the trunk with detachable fasteners 63. These canvas cover sides extend across the rear end of the platform and forwardly to the rear of the car. There is a covered window 64 with a screen (not shown) on each of the canvas cover sides. A door is formed in the rear of the camper by having one vertical zipper 65 disposed from top to bottom, and zippers (not shown) on the bottom of each side of the rear end from center to side. On either side of the vertical zipper are covered windows 66. Each window has a screen (not shown). There is a center support rod 67 which connects to a central portion of the frame and connects a central portion of the rear panel of the canvas cover. Screw eye hooks 68 are disposed at each of the top corners of the frame to support the rear upper corners of the canvas cover.

While the present invention has been described with the hinged joint construction for folding, sliding rails or telescoping sections with a removable platform are also included within the present invention. Further, an intermediate support may be added with a canvas cover to adapt a station wagon for families. In this case, the rear end of the platform would have to be supported from the ground with folding adjustable legs.

To store the camper, the canvas cover is removed, the shot bolts unfastened and the end section is folded forwardly so that it rests flat on the center section. The shot bolts are unfastened on the center section, and both end and center sections are folded over so that they rest on the front section. The three sections are then flat in the trunk. The canvas cover is folded and the cover and frame are put into the trunk.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. A car camper comprising: (a) an adjustable platform adapted to be stored within a vehicle trunk; (b) a frame cooperatively associated with said platform; (c) a cover adapted to be supported by said frame and the lid of an open trunk of a vehicle to form a camper, said platform being the floor of said camper, wherein said platform has a first section and a second section, said first section coupled to the floor of said vehicle trunk; means for pivotally coupling said first section and said second section so that said second section is movable with respect to said first section, said platform being adjustable so that said second section is foldable over said first section for storage with said trunk wherein said first section includes a supporting surface, frame means cooperatively associated with said supporting surface, said frame means including spaced side members, spaced end members coupled to said side members, one of said end members having a single aperture and bolt means for a releasably coupling said first section to the floor of said trunk, the other of said end sections carrying means for pivotally coupling said first section and said second section, and whereby said second section includes a supporting surface, frame means cooperatively associated with said supporting surface, said frame means including spaced side members, spaced end members coupled to said spaced side members, one of said end members carrying means for pivotally coupling said first section and said second section, and further carrying means for locking said sections when said platform is extended.

2. A car camper in accord with claim 1 wherein said frame side members and end members of said first and second sections are iron angle members, said frame additionally including a center support means affixed at both ends to said frame, and wherein said means for locking said sections includes a bar means affixed to said side members of one of said sections and extending outwardly therefrom, said bar means engaging the side members of the other of said sections when said platform is extended, locking means coupled to said bar means for locking said first and second sections together.

3. A car camper in accord with claim 2 wherein said platform additionally comprises means for supporting said trunk lid in an open position, said supporting means being pivotally mounted to the side frame members of one of said sections, said supporting means movable so as to lie flat against said side frame members when said platform is folded.

4. A car camper in accord with claim 3 where said second section additionally includes means for receiving an upstanding frame means for supporting one end of said canvas cover, the other end of said canvas cover supported by the open lid of said trunk.

5. A car camper in accord with claim 4 wherein said upstanding frame means is a substantially U-shaped frame, said frame means including first and second L-shaped members, each of said L-shaped members having an upstanding leg portion and a horizontal arm portion, the arm portion of the first of said members being adapted to be slidably received within the arm portion of the second of said members so that the width of said upstanding frame is adjustable, said first and second leg portions being hollow to interfit over said means for receiving and supporting said upstanding frame means, said frame means further including means for fastening the top of said canvas cover to said frame.

6. A car camper in accord with claim 5 wherein said locking means for said first and second sections includes a bolt receiving means coupled to the outer side of said bar means, a shot bolt received through said bolt receiving means, said bolt having a flange at one end thereof for removably engaging the section of said platform engaged by said bar.

References Cited

UNITED STATES PATENTS

| | | | |
|---|---|---|---|
| 2,246,813 | 6/1941 | Preston | 296—26 |
| 3,082,033 | 3/1963 | Bosher | 296—26 |

PHILIP GOODMAN, *Primary Examiner.*